United States Patent
Tsunooka et al.

(10) Patent No.: US 10,006,382 B2
(45) Date of Patent: Jun. 26, 2018

(54) APPARATUS FOR DETECTING INTER-CYLINDER AIR-FUEL RATIO IMBALANCE IN MULTI-CYLINDER INTERNAL COMBUSTION ENGINE

(71) Applicants: TOYOTA JIDOSHA KABUSHIKI KAISHA, Aichi (JP); Takashi Tsunooka, Aichi (JP); Wataru Fukui, Aichi (JP)

(72) Inventors: Takashi Tsunooka, Gotenba (JP); Wataru Fukui, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 122 days.

(21) Appl. No.: 14/441,555

(22) PCT Filed: Dec. 9, 2013

(86) PCT No.: PCT/JP2013/007240
§ 371 (c)(1),
(2) Date: May 8, 2015

(87) PCT Pub. No.: WO2014/118850
PCT Pub. Date: Aug. 7, 2014

(65) Prior Publication Data
US 2015/0292422 A1 Oct. 15, 2015

(30) Foreign Application Priority Data
Feb. 4, 2013 (JP) ................................. 2013-019627

(51) Int. Cl.
*F02B 37/18* (2006.01)
*F02D 41/00* (2006.01)
(Continued)

(52) U.S. Cl.
CPC ........ *F02D 41/0007* (2013.01); *F02B 37/183* (2013.01); *F02D 41/0085* (2013.01);
(Continued)

(58) Field of Classification Search
USPC ............... 60/602; 123/599.1, 564; 73/114.72
See application file for complete search history.

(56) References Cited

U.S. PATENT DOCUMENTS

| | | | |
|---|---|---|---|
| 8,413,497 B2 * | 4/2013 | Kayama | F02D 41/22 73/114.72 |
| 8,433,499 B2 * | 4/2013 | Otsuka | B60W 30/1882 60/602 |

(Continued)

FOREIGN PATENT DOCUMENTS

| | | |
|---|---|---|
| CN | 102132025 A | 7/2011 |
| JP | H10-9038 A | 1/1998 |

(Continued)

OTHER PUBLICATIONS

JP 2008208740 A English Translation.*

*Primary Examiner* — Phutthiwat Wongwian
*Assistant Examiner* — Jessica Kebea
(74) *Attorney, Agent, or Firm* — Hunton Andrews Kurth LLP

(57) ABSTRACT

An apparatus for detecting inter-cylinder air-fuel ratio imbalance in an engine is provided. The apparatus includes a turbocharger, a bypass passage configured to bypass a turbine of the turbocharger, a waste gate valve configured to selectively close the bypass passage, an air-fuel ratio sensor installed in a portion of an exhaust passage which portion is located on a downstream side of a junction between a downstream side of the turbine and a downstream side of the bypass passage, and a determination unit programmed to compare a value of a degree of fluctuation in an output from the air-fuel ratio sensor or a parameter correlated therewith (Continued)

with a predetermined threshold to perform inter-cylinder air-fuel ratio imbalance determination. The determination unit is programmed not to perform the imbalance determination when an opening degree of the waste gate valve is equal to or higher than a predetermined reference value.

2 Claims, 8 Drawing Sheets

(51) Int. Cl.
 *F02D 41/14* (2006.01)
 *F02B 37/22* (2006.01)
(52) U.S. Cl.
 CPC .......... *F02D 41/1456* (2013.01); *F02B 37/18* (2013.01); *Y02T 10/144* (2013.01)

(56) References Cited

U.S. PATENT DOCUMENTS

| | | | |
|---|---|---|---|
| 9,027,539 B2 * | 5/2015 | Miyashita | F01N 13/107 123/673 |
| 2011/0126812 A1 | 6/2011 | Miyashita | |
| 2011/0174282 A1 * | 7/2011 | Maruyama | F02D 41/0085 123/703 |
| 2011/0219861 A1 | 9/2011 | Kayama et al. | |
| 2012/0185157 A1 | 7/2012 | Tsunooka | |
| 2012/0222418 A1 | 9/2012 | Watanabe | |
| 2012/0283931 A1 * | 11/2012 | Otsuka | B60W 30/1882 701/103 |
| 2013/0283783 A1 * | 10/2013 | Sato | F01N 3/0864 60/603 |
| 2015/0052890 A1 * | 2/2015 | Shinoda | F02D 41/025 60/603 |
| 2016/0084152 A1 * | 3/2016 | Fujioka | F02B 37/183 60/602 |

FOREIGN PATENT DOCUMENTS

| | | |
|---|---|---|
| JP | 2008208740 A * | 9/2008 |
| JP | 2011-185159 A | 9/2011 |
| JP | 2012-107521 A | 6/2012 |
| JP | 2012-137050 A | 7/2012 |
| JP | 2012-180793 A | 9/2012 |
| JP | 5067509 B2 | 11/2012 |
| JP | 2012-241545 A | 12/2012 |
| WO | 2012/059953 A1 | 5/2012 |
| WO | 2012/077164 A1 | 6/2012 |

* cited by examiner

US 10,006,382 B2

APPARATUS FOR DETECTING INTER-CYLINDER AIR-FUEL RATIO IMBALANCE IN MULTI-CYLINDER INTERNAL COMBUSTION ENGINE

CROSS-REFERENCE TO RELATED APPLICATIONS

This is a national phase application based on the PCT International Patent Application No. PCT/JP2013/007240 filed Dec. 9, 2013, claiming priority to Japanese Patent Application No. 2013-019627 filed Feb. 4, 2013, the entire contents of both of which are incorporated herein by reference.

TECHNICAL FIELD

The present invention relates to an apparatus for detecting imbalance (i.e. variation abnormality) of inter-cylinder air-fuel ratio of a multicylinder internal combustion engine, and in particular, to an apparatus that detects that the air-fuel ratio varies among cylinders relatively significantly in a multicylinder internal combustion engine.

BACKGROUND ART

In general, to efficiently remove harmful components of exhaust gas for purification using a catalyst, an internal combustion engine with an exhaust purification system utilizing the catalyst needs to control the mixing ratio between air and fuel in an air-fuel mixture combusted in the internal combustion engine, that is, the air-fuel ratio. For such control of the air-fuel ratio, an air-fuel ratio sensor is provided in an exhaust passage of the internal combustion engine to perform feedback control to make the detected air-fuel ratio equal to a predetermined target air-fuel ratio.

On the other hand, a multicylinder internal combustion engine normally controls the air-fuel ratio using identical control amount for all cylinders. Thus, even when the air-fuel ratio control is performed, the actual air-fuel ratio may vary among the cylinders. In this case, if the variation is at a low level, the variation can be absorbed by the air-fuel ratio feedback control, and the catalyst also serves to remove harmful components of exhaust gas for purification. Consequently, such a low-level variation would not affect exhaust emissions and pose an obvious problem.

However, if, for example, fuel injection systems for some cylinders become defective to significantly vary the air-fuel ratio among the cylinders, the exhaust emissions disadvantageously deteriorate. Such a significant variation in air-fuel ratio as deteriorates the exhaust emissions is desirably detected as abnormality. In particular, for automotive internal combustion engines, there has been a demand to detect inter-cylinder air-fuel ratio imbalance in a vehicle mounted state (on board) in order to prevent a vehicle with deteriorated exhaust emissions from travelling. There has recently been a trend to legally regulate the detection of the inter-cylinder air-fuel ratio imbalance.

For example, in an apparatus described in PTL 1, the inter-cylinder air-fuel ratio imbalance is detected in a driving system including a turbocharger, a bypass passage that bypasses a turbine in the turbocharger, and a waste gate valve that opens and closes the bypass passage. The detection is performed using an air-fuel ratio sensor disposed in a portion of an exhaust passage on a downstream side of a junction between a downstream side of the turbine and a downstream side of the bypass passage. With focus placed on the fact that the influence of inter-cylinder imbalance of the air-fuel ratio is likely to appear in exhaust gas having passed through the bypass passage, the driving system detects the inter-cylinder air-fuel ratio imbalance based on an output from the air-fuel ratio sensor while the waste gate valve is open.

PTL 2 notes that, in a similar mechanical configuration, when the air-fuel ratio imbalance detection is performed while the waste gate valve is closed, the accuracy of the air-fuel ratio imbalance detection is deteriorated due to the adverse effect of stirring of exhaust gas by the turbine. To avoid this, the apparatus disclosed by PTL 2 changes an operating line (optimal fuel efficiency line) so that, when an operating point is present outside an "open" region of a waste gate valve (in a coordinate system defined by engine rotational speed and torque), the actual operating point moves into the "open" region, and controls the engine and an automatic transmission in accordance with the changed operating line. That is, the apparatus in PTL 2 performs the imbalance detection only while the waste gate valve is open.

CITATION LIST

Patent Literature
PTL 1: Japanese Patent Laid-Open No. 2011-185159
PTL 2: International Publication No. WO2012/059953

SUMMARY OF INVENTION

Technical Problem

In PTL 1 and PTL 2, the imbalance detection is performed in the mechanical configuration in which the air-fuel ratio sensor is installed on the downstream side of the junction between the downstream side of the turbine and the downstream side of the bypass passage. In this case, when the imbalance detection is performed while the waste gate valve is open, the air-fuel ratio sensor is fed with exhaust gas having passed through the turbine in the turbocharger and exhaust gas having passed through the bypass passage. In this regard, the phase of exhaust gas reaching the air-fuel ratio sensor varies between the exhaust gas having passed through the turbine in the turbocharger and the exhaust gas having passed through the bypass passage, due to a difference in the length of the exhaust passage and the diameter of an exhaust pipe for the exhaust gas. Thus, mixture of these exhaust gases may make the output from the air-fuel ratio sensor dull (or level), precluding the imbalance from being accurately detected.

Thus, the present invention has been developed in view of the above-described circumstances, and an object of the present invention is to improve detection accuracy to provide an inter-cylinder air-fuel ratio imbalance detection apparatus that can suppress misdetection.

Solution to Problem

An aspect of the present invention is an apparatus for detecting inter-cylinder air-fuel ratio imbalance in multi-cylinder internal combustion engine comprising:
  a turbocharger installed in association with a multi-cylinder internal combustion engine;
  a bypass passage configured to bypass a turbine of the turbocharger;
  a waste gate valve configured to open and close the bypass passage;

an air-fuel ratio sensor installed in a portion of an exhaust passage of the multi-cylinder internal combustion engine which portion is located on a downstream side of a junction between a downstream side of the turbine and a downstream side of the bypass passage; and a determination unit programmed to compare a value of a degree of fluctuation in an output from the air-fuel ratio sensor or a parameter correlated therewith with a predetermined threshold to perform inter-cylinder air-fuel ratio imbalance determination, characterized in that the determination unit is programmed not to perform the inter-cylinder air-fuel ratio imbalance determination when an opening degree of the waste gate valve is equal to or higher than a predetermined reference opening degree.

In this aspect, the determination unit is programmed not to perform the inter-cylinder air-fuel ratio imbalance determination when the opening degree of the waste gate valve is equal to or higher than the predetermined reference opening degree. This enables suppression of a possible decrease in accuracy resulting from the mixture of exhaust gas having passed through the turbine and exhaust gas having passed through the bypass passage.

Another aspect of the present invention is the apparatus for detecting inter-cylinder air-fuel ratio imbalance in multi-cylinder internal combustion engine according to claim 1, characterized by further comprising a cooperation control unit programmed, when the inter-cylinder air-fuel ratio imbalance determination is performed under a predetermined operating condition where the opening degree of the waste gate valve is requested to be increased above the predetermined reference opening degree:

to control the opening degree of the waste gate valve to be smaller than the predetermined reference opening degree, and to control an opening degree of a throttle valve in the multi-cylinder internal combustion engine to a decrease side so as to suppress a fluctuation in an intake air amount relative to the amount for the cases where the waste gate valve control is not performed.

Under the operating condition where, during normal control, the waste gate valve is demanded to be opened, if the waste gate valve is controlled to be closed to a predetermined opening degree or less, unintended degradation of drivability may result from an increased torque. In this regard, this aspect reduces the opening degree of the throttle valve to suppress an increase of torque resulting from an increase of intake air amount. This enables suppression of unintended degradation of drivability.

Another aspect of the present invention is the apparatus for detecting inter-cylinder air-fuel ratio imbalance in multi-cylinder internal combustion engine according to claim 1, characterized by further comprising a low-rotation high-load control unit programmed, when the inter-cylinder air-fuel ratio imbalance determination is performed, to control the multi-cylinder internal combustion engine and an automatic transmission connected to the multi-cylinder internal combustion engine so that an engine rotational speed is smaller and a load is higher than those for normal control.

In general, the inter-cylinder air-fuel ratio imbalance determination can be more accurately performed at "a lower rotational speed and a higher load" because noise components are relatively reduced to increase resolution. Thus, according to this aspect, when the imbalance determination is performed, the multicylinder internal combustion engine and the automatic transmission are controlled to make the rotational speed lower and the load higher than those for the normal control. As a result, the imbalance determination can be accurately performed.

The present invention exerts an excellent effect that suppresses the adverse effect of the mixture of the exhaust gas having passed through the turbine and the exhaust gas having passed through the bypass passage to improve detection accuracy, thus allowing misdetection to be suppressed.

DESCRIPTION OF EMBODIMENTS

An embodiment of the present invention will be described below with reference to the attached drawings.

Figure 1:
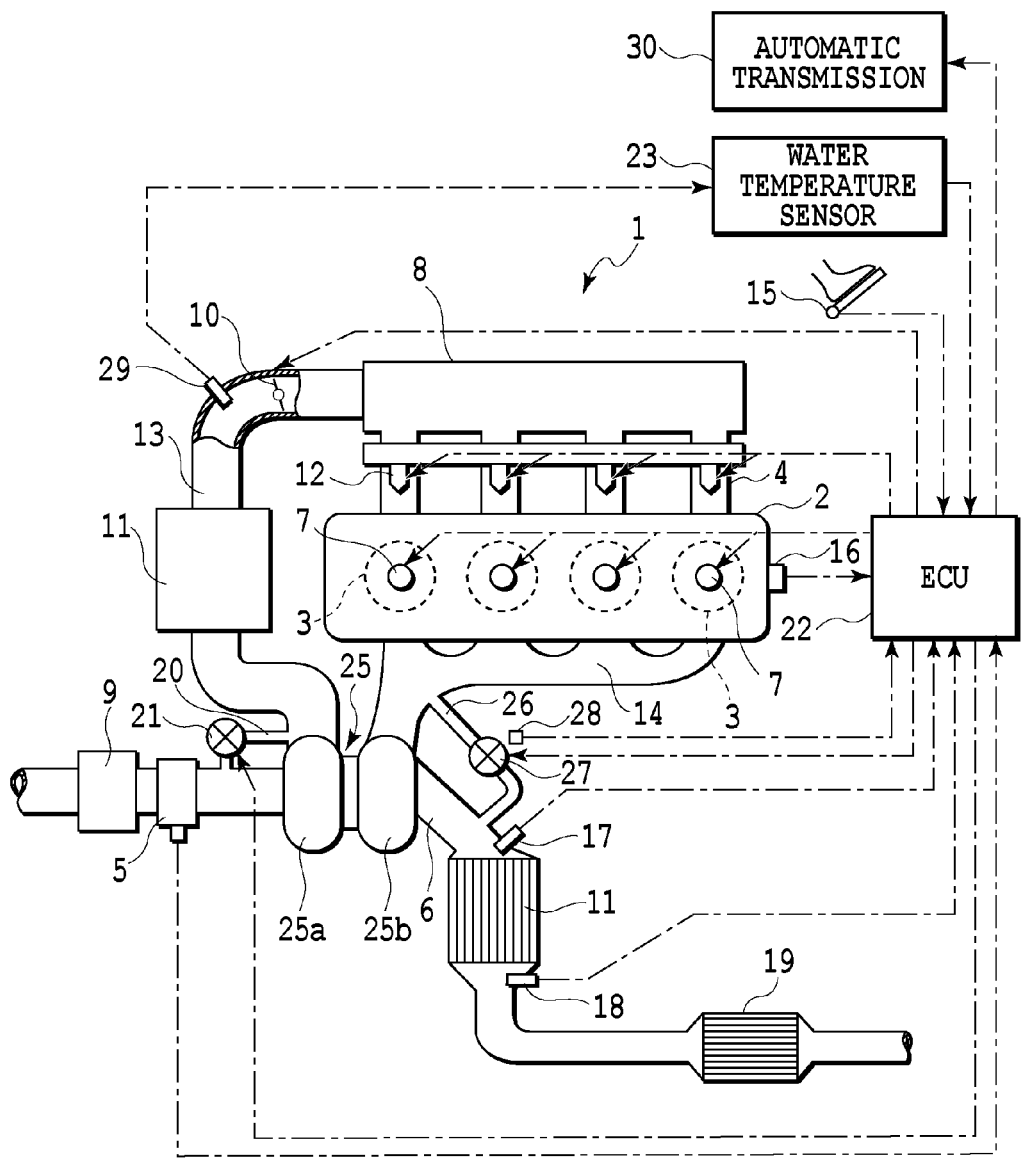
FIG. 1 is a schematic diagram of an internal combustion engine according to a first embodiment of the present invention.

FIG. 1 is a schematic diagram of an internal combustion engine according to the present embodiment. An internal combustion engine (engine) 1 combusts a mixture of fuel and air inside a combustion chamber 3 formed in a cylinder block 2, and reciprocates a piston in the combustion chamber 3 to generate power. The internal combustion engine 1 according to the present embodiment is a multicylinder internal combustion engine mounted in a car, more specifically, an inline-four spark ignition internal combustion engine, that is a gasoline engine. However, the internal combustion engine to which the present invention is applicable is not limited to such an internal combustion engine as described above. The number, type, and the like of the cylinders are not particularly limited provided that the internal combustion engine includes multiple cylinders. An output shaft of the internal combustion engine 1 is connected to a torque converter an automatic transmission 30, and a differential gear assembly (none of which is shown in the drawings) to drive driving wheels. The automatic transmission 30 is of a stepped type but may be of a continuously variable type.

Although not shown, a cylinder head of the internal combustion engine 1 includes intake valves each disposed at a corresponding cylinder to open and close a corresponding intake port and exhaust valves each disposed at a corresponding cylinder to open and close a corresponding exhaust port. Each intake valve and each exhaust valve are opened and closed by a cam shaft or a solenoid actuator. The cylinder head includes ignition plugs 7 each attached to a top portion of the cylinder head for the corresponding cylinder to ignite the air-fuel mixture in the combustion chamber 3.

The intake port of each cylinder is connected, via a branch pipe 4 for each cylinder, to a surge tank 8 that is an intake air aggregation chamber. An intake pipe 13 is connected to an upstream side of the surge tank 8, and the intake pipe 13 is coupled to an air cleaner 9 via a compressor 25*a* of a turbocharger 25. The intake pipe 13 incorporates an air flow meter 5 for detecting the intake air amount (the amount of air sucked per unit time, that is, the flow rate of intake air) and an electronically controlled throttle valve 10. The intake ports, the branch pipes 4, the surge tank 8, and the intake pipe 13 form an intake passage. An intercooler 11 is disposed around the intake pipe 13 to cool intake air flowing through the intake pipe 13. Engine cooling water is guided into the intercooler 11 to cool the intake air. In order to bypass the compressor 25*a* of the turbocharger 25 to be bypassed, an air bypass passage 20 and an electronically controlled air bypass valve (ABV) 21 that opens and closes the air bypass passage 20 are installed. When the throttle valve 10 is rapidly closed, the ABV 21 prevents the upstream-side pressure of the throttle valve 10 from temporarily rising rapidly and thus prevents possible surge sound from the turbocharger 25.

Each cylinder includes an injector (fuel injection valve) 12 disposed therein to inject fuel into the intake passage, particularly into the intake port. The fuel injected by the injector 12 is mixed with intake air to form an air-fuel mixture, which is then sucked into the combustion chamber 3 when the intake valve is opened. The air-fuel mixture is compressed by the piston and then ignited and combusted by the ignition plug 7.

On the other hand, the exhaust port of each cylinder is connected to an exhaust manifold 14. The exhaust manifold 14 includes branch pipes for respective cylinders which form an upstream portion of the exhaust manifold 14 and an exhaust aggregation section forming a downstream portion of the exhaust manifold 14. The downstream side of the exhaust aggregation section is coupled to an inlet of an exhaust turbine 25*b* in the turbocharger 25. An outlet of the exhaust turbine 25*b* is connected to an exhaust pipe 6. The exhaust ports, the exhaust manifold 14, and the exhaust pipe 6 form an exhaust passage. In order to bypass the exhaust turbine 25*b* of the turbocharger 25, a bypass passage 26 and an electronically controlled waste gate valve (WGV) 27 that opens and closes the bypass passage 26 are installed. The WGV 27 is configured to drive a valve body using a motor and a gear mechanism. The gear mechanism includes, for example, a worm gear and a helical gear. A WGV opening sensor 28 is provided which detects the rotational position of the helical gear to detect the opening degree of the valve body. The WGV 27 may be of a diaphragm type that is controlled by boost pressure or intake pipe pressure.

Catalysts each including a three-way catalyst, that is, an upstream catalyst 11 and a downstream catalyst 19, are arregiond in series and attached to the exhaust pipe 6. The upstream catalyst 11 and the downstream catalyst 19 are formed of, for example, alumina carrying rare metal such as platinum (Pt), palladium (Pd), or rhodium (Rh). Carbon oxide (CO), hydrocarbon (HC), nitrogen oxide (NOx), and the like can be collectively removed for purification by catalytic reaction.

A pre-catalyst sensor 17 and a post-catalyst sensor 18 are installed upstream and downstream, respectively, of the upstream catalyst 11 to detect the air-fuel ratio of exhaust gas. The pre-catalyst sensor 17 and the post-catalyst sensor 18 are installed immediately before and after the upstream catalyst, respectively, to detect the air-fuel ratio based on the concentration of oxygen in the exhaust. The pre-catalyst sensor 17 corresponds to an "air-fuel ratio sensor" according to the present invention. The pre-catalyst sensor 17 is installed on a downstream side of a junction between a downstream side of the exhaust turbine 25*b* and a downstream side of the bypass passage 26 in the exhaust passage.

The ignition plug 7, the throttle valve 10, the injector 12, the ABV 21, the WGV 27, and the like are electrically connected to an electronic control unit (hereinafter referred to as an ECU) 22 serving as a controller. The ECU 22 includes a CPU, a ROM, a RAM, I/O ports, and a storage device, none of which is shown in the drawings. Furthermore, the ECU 22 connects electrically to, besides the above-described airflow meter 5, pre-catalyst sensor 17, post-catalyst sensor 18, and WGV opening sensor 28, a crank angle sensor 16 that detects the crank angle of the internal combustion engine 1, an accelerator opening sensor 15 that detects the opening degree of an accelerator, a supercharge pressure sensor 29 disposed on a downstream side of the intercooler 11 in the intake pipe 13 to detect the pressure (supercharge pressure) upstream the throttle valve 10, and various other sensors via A/D converters or the like (not shown in the drawings). Based on detection values from the various sensors, the ECU 22 controls the ignition plug 7, the throttle valve 10, the injector 12, the automatic transmission 30, and the like to control an ignition timing, the throttle opening degree, the fuel injection amount, a fuel injection timing, a change gear ratio, and the like so as to obtain desired outputs. The throttle opening degree is normally controlled to a value dependent on the accelerator opening degree. The ECU 22 also controls the ABV 21 and the WGV 27 to allow intake air and exhaust gas to bypass as needed. The ECU 22 is equipped with the functions of a determination unit according to the present invention.

Figure 2:
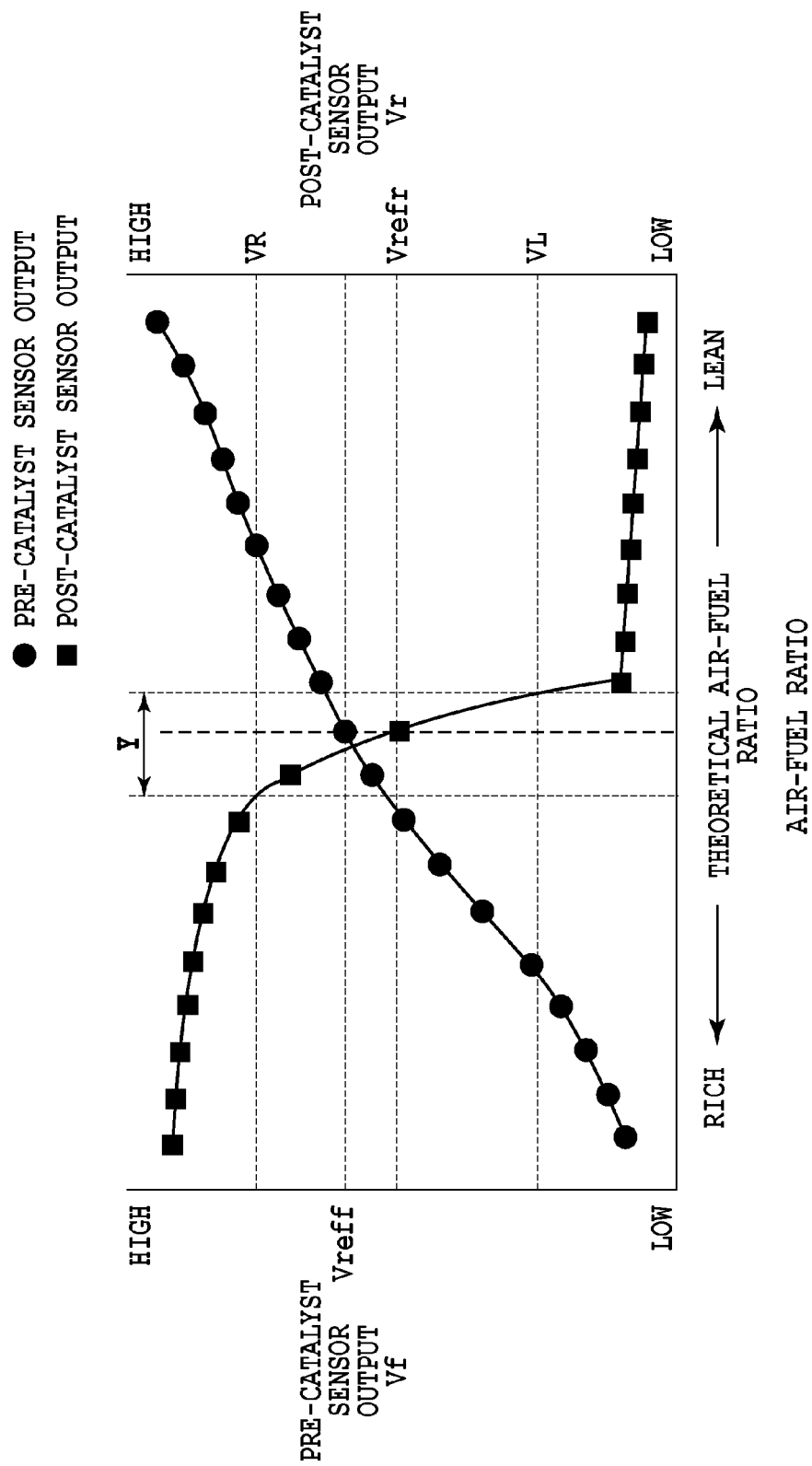
FIG. 2 is a graph depicting output characteristics of a pre-catalyst sensor and a post-catalyst sensor.

The pre-catalyst sensor 17 includes a so-called wide-region air-fuel ratio sensor and can continuously detect a relatively wide region of air-fuel ratios. FIG. 2 shows the output characteristic of the pre-catalyst sensor 17. As shown in FIG. 2, the pre-catalyst sensor 17 outputs a voltage signal Vf of a magnitude proportional to a detected exhaust air-fuel ratio (pre-catalyst air-fuel ratio A/Ff). An output voltage obtained when the exhaust air-fuel ratio is stoichiometric (i.e. a theoretical air-fuel ratio, for example, A/F=14.6) is Vreff (for example, 3.3 V).

On the other hand, the post-catalyst sensor 18 includes a so-called $O_2$ sensor and has a characteristic that an output value from the post-catalyst sensor 18 changes abruptly across the stoichiometric ratio. As shown in FIG. 2, an output voltage obtained when the exhaust air-fuel ratio (post-catalyst air-fuel ratio A/Fr) is stoichiometric, that is, a stoichiometric equivalent value is Vrefr (for example, 0.45 V). The output voltage of the post-catalyst sensor 18 varies within a predetermined region (for example, from 0 V to 1 V). When the exhaust air-fuel ratio is leaner than the stoichiometric ratio, the output voltage of the post-catalyst sensor 18 is lower than the stoichiometric equivalent value Vrefr. When the exhaust air-fuel ratio is richer than the stoichiometric ratio, the output voltage of the post-catalyst sensor is higher than the stoichiometric equivalent value Vrefr.

The upstream catalyst 11 and the downstream catalyst 19 simultaneously remove NOx, HC, and CO when the air-fuel ratio A/F of exhaust gas flowing into each of the catalysts is close to the stoichiometric ratio. The region (window) of the air-fuel ratio within which the three components can be efficiently removed for purification at the same time is relatively narrow.

Thus, the ECU 22 performs air-fuel ratio control so as to control the air-fuel ratio of exhaust gas flowing into the upstream catalyst 11 to the vicinity of the stoichiometric ratio. The air-fuel ratio control includes main air-fuel ratio control (main air-fuel ratio feedback control) that makes the exhaust air-fuel ratio detected by the pre-catalyst sensor 17 equal to the stoichiometric ratio, which is a predetermined target air-fuel ratio and auxiliary air-fuel ratio control (auxiliary air-fuel ratio feedback control) that makes the exhaust air-fuel ratio detected by the post-catalyst sensor 18 equal to the stoichiometric ratio.

For example, assume that the injectors 12 for some of all the cylinders break down to cause a variation (imbalance) in the air-fuel ratio among the cylinders. For example, the fuel injection amount may be larger in a #1 cylinder than in a #2 cylinder, a #3 cylinder, and a #4 cylinder, and the air-fuel ratio in the #1 cylinder may deviate significantly toward the rich side. Even in this case, the air-fuel ratio of total gas supplied to the pre-catalyst sensor 17 could be controlled to the stoichiometric ratio by performing the above-described main air-fuel ratio feedback control to allow application of a relatively large amount of correction. However, the air-fuel ratios of the individual cylinders are such that the air-fuel ratio in the #1 cylinder is much richer than the stoichiometric ratio, while and the air-fuel ratio in the #2, #3, and #4 cylinders are leaner than the stoichiometric ratio. Thus, the air-fuel ratios are balanced only in total as stoichiometric, but it is obviously not preferable for emission. Thus, the present embodiment includes an apparatus that detects such inter-cylinder air-fuel ratio imbalance.

Figure 3:
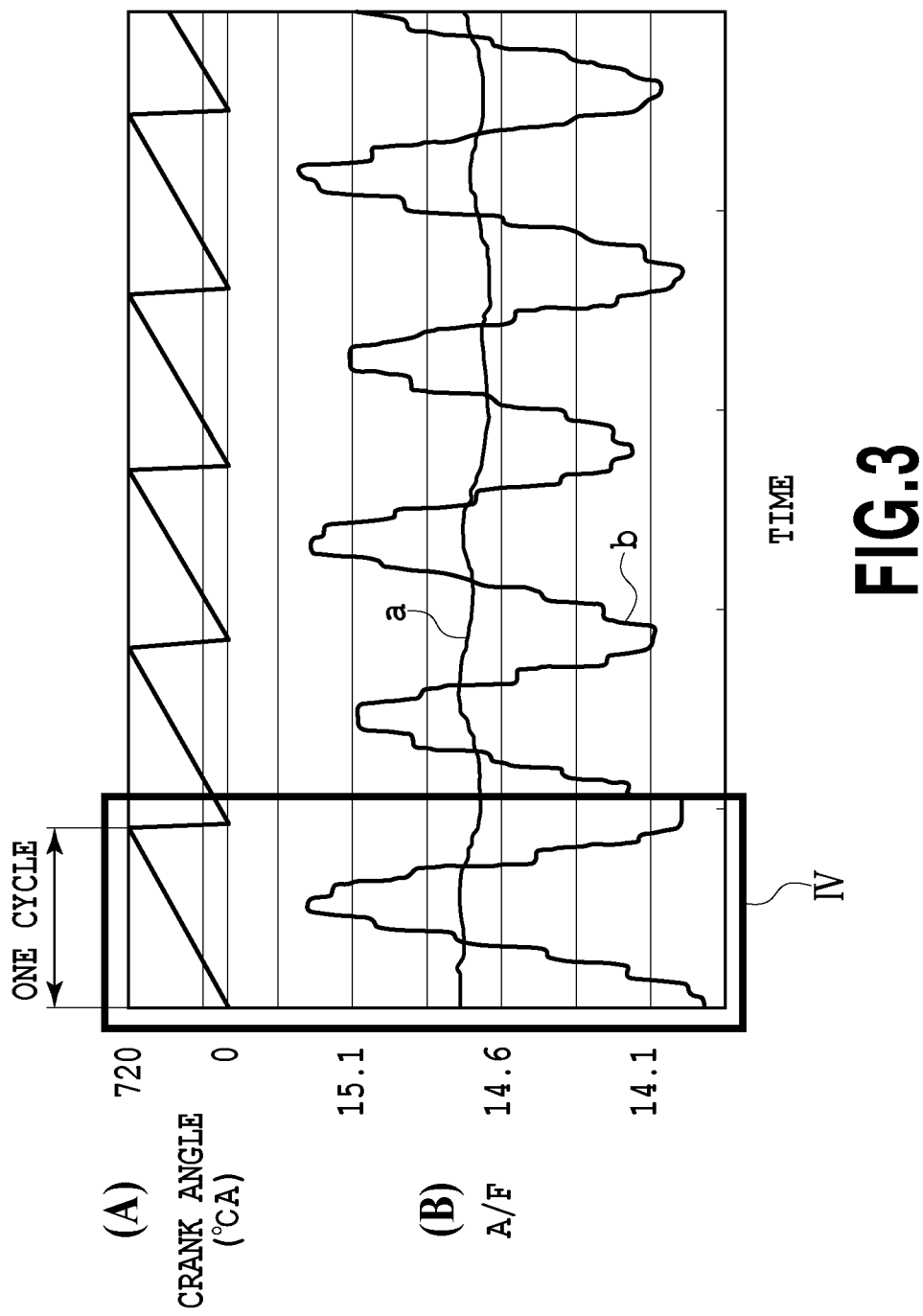
FIG. 3 is a graph depicting a fluctuation in air-fuel ratio sensor output in a case where a waste gate valve is open (diagram (a)) and in a case where the waste gate valve is closed (diagram (b))

As shown in FIG. 3, the exhaust air-fuel ratio A/F detected by the pre-catalyst sensor 17 tends to fluctuate periodically in each period of one engine cycle (=720° CA). When an inter-cylinder air-fuel ratio variation occurs, a more significant fluctuation occurs within one engine cycle. An air-fuel ratio diagram (a) in FIG. 3(B) shows that the WGV 27 is open. An air-fuel ratio diagram (b) in FIG. 3(B) shows that the WGV 27 is closed. As shown, when the WGV 27 is open, the amplitude of a fluctuation in air-fuel ratio is relatively small. The reason why the amplitude of a fluctuation in air-fuel ratio is relatively small when the WGV 27 is open is considered to be that the phase of exhaust gas reaching the air-fuel ratio sensor varies between exhaust gas having passed through the turbine and exhaust gas having passed through the bypass passage because of a difference in the length of the exhaust path and the diameter of the exhaust pipe for the exhaust gas and that the mixture of these gases makes the output from the air-fuel ratio sensor dull (that is, level). FIG. 3 is schematically shown for easy understanding.

In this regard, an imbalance rate (%) is a parameter indicative of the degree of inter-cylinder variation of air-fuel ratio. That is, the imbalance rate is a value indicative of the rate at which, only one of all the cylinders is subjected to deviation of the fuel injection amount, the cylinder subjected to deviation of the fuel injection amount (imbalance cylinder) deviates from the fuel injection amount in the cylinders not subjected to deviation of the fuel injection amount, that is, the reference fuel injection amount (these cylinders are hereinafter referred to as balanced cylinders). When the imbalance rate is denoted by IB, and the fuel injection amount in the imbalanced cylinder is denoted by Qib, the fuel injection amount in the balanced cylinder, that is, the reference fuel injection amount, is denoted by Qs, IB=(Qib−Qs)/Qs. An increased imbalance rate IB increases the deviation of the fuel injection amount in the imbalanced cylinder with respect to the balanced cylinders, and thus the degree of variation in air-fuel ratio.

[Inter-Cylinder Air-fuel Ratio Imbalance Detection]

As is understood from the above description, occurrence of air-fuel ratio imbalance makes a fluctuation in pre-catalyst sensor output more significant. Thus, monitoring the degree of fluctuation enables the air-fuel ratio imbalance to be detected. In the present embodiment, a fluctuation parameter is calculated, which is a parameter correlated with the degree of fluctuation in pre-catalyst sensor output. Furthermore, the fluctuation parameter is compared with a predetermined abnormality determination value to detect the imbalance.

Figure 4:
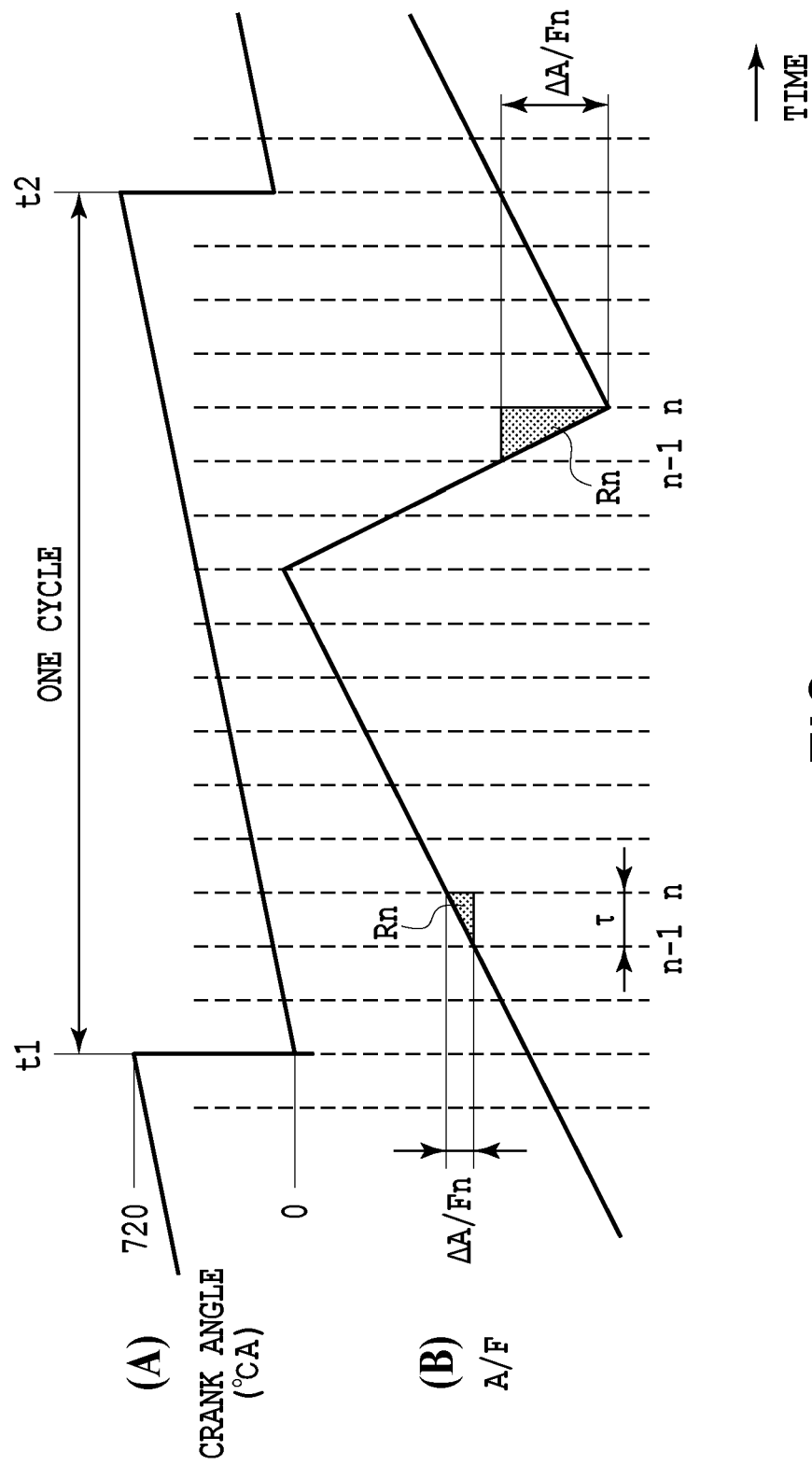
FIG. 4 is an enlarged diagram corresponding to an IV portion in FIG. 3.

Now, a method for calculating the fluctuation parameter will be described. FIG. 4 is an enlarged diagram corresponding to an IV portion in FIG. 3, and specifically shows a fluctuation in pre-catalyst sensor output. In this case, the pre-catalyst sensor output is a value resulting from conversion of the output voltage Vf from the pre-catalyst sensor 17 into the air-fuel ratio A/F. However, the output voltage Vf from the pre-catalyst sensor 17 may be directly used.

As shown in a (B) section of FIG. 4, the ECU 22 acquires the value of the pre-catalyst sensor output A/F at each predetermined sample period t (unit time, for example, 4 ms) within one engine cycle. Then, the difference $\Delta A/F_n$ between a value $A/F_n$ acquired at the current timing (second timing) and a value $A/F_{n-1}$ acquired at the last timing (first timing) is determined in accordance with Expression (1) illustrated below. The difference $\Delta A/F_n$ may be reworded as a differential value or a gradient acquired at the current timing.

[Expression 1]

$$\Delta A/F_n = A/F_n - A/F_{n-1} \qquad (1)$$

Most simply stated, the difference $\Delta A/F_n$ represents a fluctuation in pre-catalyst sensor output. An increased degree of fluctuation increases the absolute value of the gradient of the air-fuel ratio diagram, and thus, the absolute value of the difference $\Delta A/F_n$. Consequently, the value of the difference $\Delta A/F_n$ at a predetermined timing may be specified as a fluctuation parameter.

However, in the present embodiment, the mean value of a plurality of differences $\Delta A/F_n$ is specified as a fluctuation parameter in order to enhance accuracy. In the present embodiment, the difference $\Delta A/F_n$ is integrated at each timing within one engine cycle, and the final integral value is divided by the number of samples N to determine the mean value of the differences $\Delta A/F_n$ within the engine cycle. Moreover, the mean values of the differences $\Delta A/F_n$ are integrated for M engine cycles (for example, M=100), and the final integral value is divided by the number of cycles M to determine the mean value of the differences $\Delta A/F_n$ within the M engine cycles.

The absolute value of the mean value of the differences $\Delta A/F_n$ within the M engine cycles increases consistently with the degree of fluctuation in pre-catalyst sensor output. Thus, the presence of imbalance is determined when the absolute value of the mean value is equal to or larger than a predetermined abnormality determination value. The absence of imbalance, that is, normality, is determined when the mean value is smaller than the abnormality determination value.

The pre-catalyst sensor output A/F may increase or decrease. Thus, the difference $\Delta A/F_n$ or the mean value of the differences $\Delta A/F_n$ may be determined exclusively for one of the cases of increase and decrease, and specified as a fluctuation parameter. In particular, if a rich-side deviation occurs in only one cylinder, when the pre-catalyst sensor receives exhaust gas corresponding to this cylinder, the output from the pre-catalyst sensor changes rapidly to the rich side (that is, decreases rapidly). Consequently, the value only for the decrease side can be used for rich-side deviation detection (rich imbalance determination). In this case, only a decreasing slope portion of the graph in the (B) portion of FIG. 4 is utilized for rich-side deviation detection. In general, a shift from lean side to rich side is more rapid than a shift from rich side to lean side. Hence, this method is expected to accurately detect a rich-side deviation. Of course, the present embodiment is not limited to this method. The value for the increase side may be exclusively used or both values for the decrease and increase sides may be used (by integrating the absolute values of the differences $\Delta A/F_n$ and comparing the resultant integral value with a threshold).

Furthermore, any value correlated with the degree of fluctuation in pre-catalyst sensor output may be specified as a fluctuation parameter. For example, the fluctuation parameter may be calculated based on the difference between the maximum value and minimum value (a so-called peak to peak) of the pre-catalyst sensor output within one engine cycle. This is because the difference increases consistently with the degree of fluctuation in pre-catalyst sensor output.

In an internal combustion engine with a turbocharger, a air-fuel ratio sensor may be disposed in a portion of an exhaust passage on a downstream side of the junction between the downstream side of a turbine and the downstream side of a bypass passage. In this case, the phase of exhaust gas reaching the air-fuel ratio sensor 17 (air-fuel ratio sensor) varies between exhaust gas having passed through the turbine and exhaust gas having passed through the bypass passage, because of a difference in the length of the exhaust path and the diameter of the exhaust pipe for the exhaust gas, making it difficult to accurately detect the imbalance. For example, as shown in FIG. 3, even for an engine exhibiting a significant variation in the value of A/F when measurement is performed with the WGV 27 closed (curve (b)), the variation in the value of A/F is less significant when measurement is performed with the WGV 27 open (curve (a)), as described above. Thus, if detection of the air-fuel ratio imbalance is performed without regard for the operational status of the WGV 27, the detection accuracy would be degraded, resulting in misdetection. In view of such a phenomenon, the present embodiment suppresses a degradation of detection accuracy using the following abnormality detection routine.

[Inter-Cylinder Air-Fuel Ratio Imbalance Detection Routine]

Figure 5:
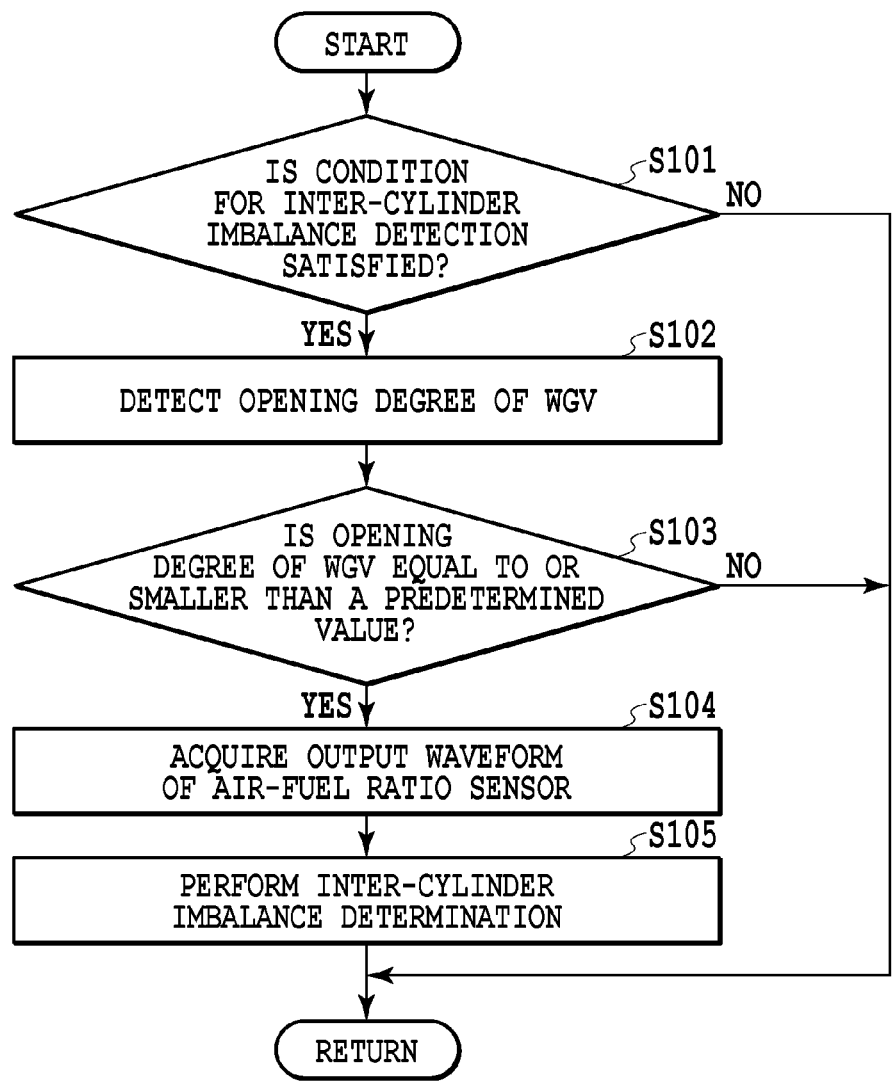
FIG. 5 is a flowchart depicting a routine for inter-cylinder air-fuel ratio imbalance detection according to the first embodiment.

Now, the inter-cylinder air-fuel ratio imbalance detection routine will be described using FIG. 5.

First, in step S101, it is determined whether or not a predetermined condition suitable for inter-cylinder air-fuel ratio imbalance detection is satisfied. The condition is satisfied when the following condition items are met.

(1) Warm-up of the internal combustion engine 1 is complete. The warm-up is determined to be complete, for example, when a water temperature detected by a water temperature sensor 23 is equal to or higher than a predetermined value.

(2) At least the pre-catalyst sensor 17 has been activated.
(3) The internal combustion engine 1 is operating steadily.
(4) Stoichiometric control is in execution.

(5) The internal combustion engine 1 is operating within a detection region.

(6) The output A/F from the pre-catalyst sensor 17 is decreasing.

Of these condition items, the condition item (6) indicates that the routine depends on the above-described rich imbalance determination (method in which only the value for the decrease side is used for rich-side deviation). When the condition has not been satisfied, the routine is terminated.

On the other hand, when the condition has been satisfied, an open/close status of the WGV 27 is detected in accordance with a signal from the WGV opening sensor 28 (S102). Then, based on the result of the detection, it is determined whether or not the opening degree of the WGV 27 is equal to or smaller than a predetermined value (S103). A reference value for step S103 at which the WGV 27 is determined to be closed is set such that, when the opening degree of the WGV 27 is smaller than the reference value, the mixture of exhaust gases with different phases is suppressed to within an allowable region, and a sufficient amount of exhaust gas having passed through the exhaust turbine 25b reaches the pre-catalyst sensor 17.

When the determination in step S103 is affirmative, that is, when the opening degree of the WGV 27 is equal to or smaller than the predetermined value, the mixture of the exhaust gases with the different phases is suppressed to within the allowable region, and a sufficient amount of exhaust gas having passed through the exhaust turbine 25b reaches the pre-catalyst sensor 17. In this case, a fluctuation in air-fuel ratio is subsequently detected based on the output from the pre-catalyst sensor 17 (S104). The output $A/F_n$ from the pre-catalyst sensor (first air-fuel ratio sensor) at the current timing is acquired, and the output difference $\Delta A/F_n$ at the current timing is calculated in accordance with Expression (1) described above, and stored. These processes are repeatedly executed until M cycles (M is any natural number) end. When the M cycles end, the mean value $\Delta A/F_{AV}$ of the calculated output differences $\Delta A/F_n$ is calculated, for example, by dividing the integral value of the differences $\Delta A/F_n$ by the number of samples N and the number of engine cycles M as described above. The mean value $\Delta A/F_{AV}$ represents a fluctuation in air-fuel ratio.

Then, based on the detected fluctuation in air-fuel ratio, imbalance determination is performed (S105). Specifically, it is determined whether the absolute value of the mean value $\Delta A/F_{AV}$ of the differences $\Delta A/F_n$ is larger than a predetermined abnormality threshold $\alpha$. When the absolute value of the mean value $\Delta A/F_{AV}$ is smaller than the abnormality threshold $\alpha$, the absence of imbalance, that is, normality, is determined. When the absolute value of the mean value $\Delta A/F_{AV}$ is equal to or larger than the abnormality threshold $\alpha$, the presence of imbalance, that is, abnormality, is determined, and the routine is terminated. Preferably, simultaneously with the abnormality determination or when the abnormality determination is consecutively made for two trips (that is, for two consecutive trips each from engine start to stop), an alarm apparatus such as a check lamp is activated in order to notify a user of the fact of the abnormality, and abnormality information is stored in a predetermined diagnosis memory so that a car mechanic can call up the abnormality information.

On the other hand, when the determination in step S103 is negative, that is, when the opening degree of the WGV 27 is larger than the predetermined value, the pre-catalyst sensor 17 is supplied with exhaust gas having passed through the exhaust turbine 25b and exhaust gas having a phase different therefrom having passed through the bypass passage 26 instead of the exhaust turbine 25b, the exhaust gases being mixed together to a degree beyond the allowable region, or otherwise, a sufficient amount of exhaust gas having passed through the exhaust turbine 25b does not reach the pre-catalyst sensor 17. Thus, the imbalance detection based on the output from the pre-catalyst sensor 17 is not performed, and the routine is terminated.

As a result of such a series of processes, according to the present embodiment, when the opening degree of the WGV 27 is equal to or smaller than the predetermined value, the imbalance detection based on the output from the pre-catalyst sensor 17 (air-fuel ratio sensor) is performed. However, when the opening degree of the WGV 27 is larger than the predetermined value, the imbalance detection is prohibited and is not performed. This enables suppression of a possible decrease in accuracy resulting from the mixture of the exhaust gas having passed through the exhaust turbine 25b and the exhaust gas having passed through the bypass passage 26. Thus, possible misdetection can be suppressed.

Now, a second embodiment of the present invention will be described. In the above-described first embodiment, the WGV opening sensor 28 for detecting the opening degree of the WGV 27 is provided so that the output from the WGV 27 opening sensor 28 is used to determine whether or not to prohibit the imbalance detection (S102). In the second embodiment, instead of the output from the WGV opening sensor 28, a detection value for supercharge pressure is utilized for the determination. The remaining part of the mechanical configuration of the second embodiment is similar to the corresponding parts of the mechanical configuration of the above-described first embodiment and will thus not be described below in detail.

Figure 6:
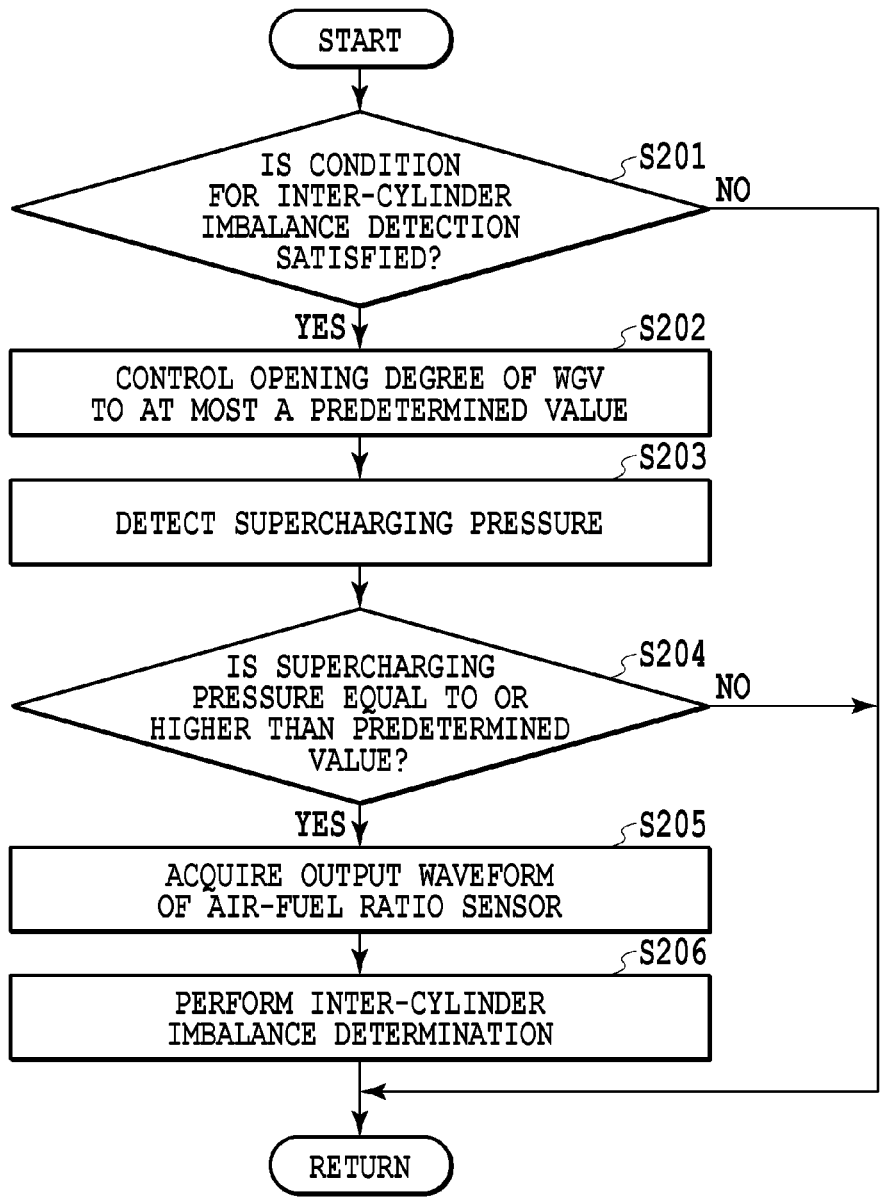
FIG. 6 is a flowchart depicting a routine for inter-cylinder air-fuel ratio imbalance detection according to a second embodiment.

Control according to the second embodiment will be described in accordance with FIG. 6. First, the ECU 22 determines whether or not a predetermined condition suitable for the imbalance detection is satisfied (S201). The processing in step S201 is similar to the processing in step S101 according to the above-described first embodiment (FIG. 5).

Then, the ECU 22 controls the opening degree of the WGV 27 to at most the predetermined value (S202). The control of the WGV 27 is performed by means of open loop control that utilizes the count of the number of rotations of a motor driving the WGV 27 without utilizing the output from the WGV opening sensor 28. The predetermined value, that is, a target value for the opening degree of the WGV 27, is set to be able to achieve at least a predetermined supercharge pressure so that, when the opening degree of the WGV 27 is smaller than the predetermined value, the mixture of exhaust gases with different phases is suppressed to within the allowable region, and a sufficient amount of exhaust gas having passed through the exhaust turbine 25b reaches the pre-catalyst sensor 17.

Then, the ECU 22 loads a detection value from the supercharge pressure sensor 29 to detect the current supercharge pressure (S203). Then, it is determined whether the detected current supercharge pressure is equal to or higher than a predetermined reference value (S204).

When the determination in step S204 is affirmative, that is, when the current supercharge pressure is equal to or higher than a predetermined reference value, the mixture of the exhaust gases with the different phases is suppressed to within the allowable region, and a sufficient amount of exhaust gas having passed through the exhaust turbine 25b reaches the pre-catalyst sensor 17. In this case, a fluctuation in air-fuel ratio is subsequently detected based on the output from the pre-catalyst sensor 17 (S206). The processing in steps S205 and S206 is similar to the processing in steps S104 and S105 according to the above-described first embodiment.

On the other hand, when the determination in step S204 is negative, that is, when the current supercharge pressure is lower than the predetermined value, the pre-catalyst sensor 17 is supplied with exhaust gas having passed through the exhaust turbine 25b and exhaust gas having a phase different therefrom and having passed through the bypass passage 26 instead of the exhaust turbine 25b, the exhaust gases being mixed together to a degree beyond the allowable region, or otherwise a sufficient amount of exhaust gas having passed through the exhaust turbine 25b does not reach the pre-catalyst sensor 17. Thus, the imbalance detection based on the output from the pre-catalyst sensor 17 is not performed, and the routine is terminated.

As a result of such a series of processes, according to the present embodiment, when the current supercharge pressure is equal to or higher than the predetermined reference value, the imbalance detection based on the output from the pre-catalyst sensor 17 (air-fuel ratio sensor) is performed. However, when the current supercharge pressure is lower than the reference value, the imbalance detection is prohibited and is not performed. This enables suppression of a possible decrease in accuracy resulting from the mixture of the exhaust gas having passed through the exhaust turbine 25b and the exhaust gas having passed through the bypass passage 26. Thus, possible misdetection can be suppressed.

Now, a third embodiment of the present invention will be described. In general, the inter-cylinder air-fuel ratio imbalance detection can be more accurately preformed at "a lower rotational speed and a higher load" because noise components relatively decease to improve resolution. In view of this, the third embodiment controls the internal combustion engine 1 and the automatic transmission 30 connected to the engine 1 to change the control from the normal control so as to select an operating region with "a lower rotational speed and a higher load" compared to the operating region for the normal control. The remaining part of the mechanical configuration of the third embodiment is similar to the corresponding part of the mechanical configuration of the above-described first embodiment and will thus not be described below in detail.

Figure 7:
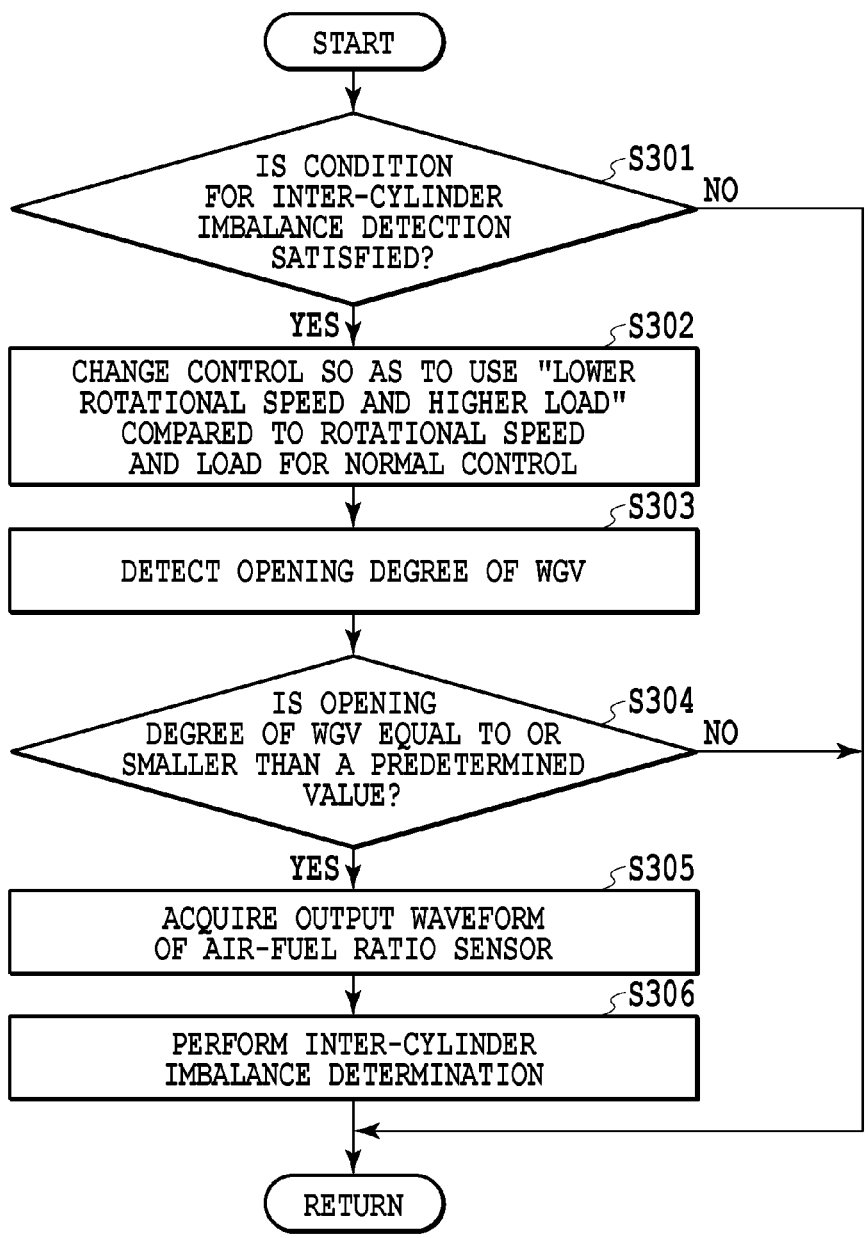
FIG. 7 is a flowchart depicting a routine for inter-cylinder air-fuel ratio imbalance detection according to a third embodiment.

Control according to the third embodiment will be described in accordance with FIG. 7. First, the ECU 22 determines whether or not a predetermined condition suitable for abnormality detection is satisfied (S301). The processing in step S301 is similar to the processing in step S101 according to the above-described first embodiment (FIG. 5).

Then, the ECU 22 controls the internal combustion engine 1 and the automatic transmission 30 to change the control from the normal control so as to select an operating region with "a lower rotational speed and a higher load" compared to the operating region for the normal control (S302). The normal control as used herein refers to a control state present when such a change in control is not performed. The engine rotational speed, and a shift gear stage or a change gear ratio are set basically in accordance with a predetermined shift gear stage map based on a vehicle speed and a demand load. The change of control is performed, for example, by changing a shift gear stage map that specifies a shift gear stages to be selected in association with the vehicle speed or rotational speed and the demand load, so as to allow selection of a gear ratio that is higher than the gear ratio for normal operation (higher shift gear stage) (that is, by changing so-called speed change lines so that upshifting is performed at a lower vehicle speed or a lower rotational speed compared to the vehicle speed or rotational speed for the normal control).

Then, with the control thus changed, the open/close status of the WGV 27 is detected in accordance with a signal from the WGV opening sensor 28 (S303). Then, based on the result of the detection, it is determined whether or not the opening degree of the WGV 27 is equal to or lower than the predetermined value (S304). When the determination in step S304 is affirmative, a fluctuation in air-fuel ratio is detected based on the output of the pre-catalyst sensor 17 (S305). Based on the detected fluctuation in air-fuel ratio, the imbalance determination is performed (S306). The processing in steps S303 to S306 is similar to the processing in steps S102 to S105 according to the above-described first embodiment (FIG. 5).

As a result of such a series of processes, according to the present embodiment, when the opening degree of the WGV 27 is higher than the predetermined reference value, the imbalance detection is prohibited and is not performed. This enables suppression of a possible decrease in accuracy resulting from the mixture of the exhaust gas having passed through the exhaust turbine 25*b* and the exhaust gas having passed through the bypass passage 26. Thus, possible misdetection can be suppressed. When the imbalance detection is performed, the engine 1 and the automatic transmission 30 are controlled to change the control from the normal control so as to select an operating region with "a lower rotational speed and a higher load" compared to the operating region for the normal control (S302). As a result, the imbalance detection can be accurately carried out.

The change of the control in step S302, that is, such a change of the control as selects an operating region with "a lower rotational speed and a higher load" compared to the operating region for the normal control, can be achieved in another manner, and is applicable to a vehicle with a mechanical configuration of a driving system that is different from that of the third embodiment. For example, in a hybrid vehicle that utilizes an internal combustion engine and a motor generator for traveling, increasing the amount of power regenerated by the motor generator allows selection of an operating region with "a lower rotational speed and a higher load" compared to the operating region for the normal control. This enables an application of the processing according to the third embodiment as it is.

Now, a fourth embodiment of the present invention will be described. In general, in an internal combustion engine with a turbocharger having a bypass passage and a waste gate valve, throttle opening may be increased compared to the opening degree for the normal control with the waste gate valve open, in order to reduce a pumping loss to improve fuel efficiency in an operating region where desired output can be achieved without supercharging, that is, in a region with a relatively low load (this control is hereinafter referred to as "pumping loss reduction control). However, while the waste gate valve is open, imbalance may fail to be accurately detected, due to the mixture of exhaust gas having passed through the turbine and exhaust gas having passed through the bypass passage, as described above. Thus, in the fourth embodiment, even under an operating condition where the waste gate valve is open during the normal control, the following control is performed when the inter-cylinder air-fuel ratio imbalance determination is carried out: the waste gate valve is controlled to be closed to at most a predetermined opening degree, and the intake air amount is controlled to be equivalent to a value obtained when the closing control of the waste gate valve is not performed, by controlling the throttle opening. In other words, in the fourth embodiment, under a predetermined operating condition where the opening degree of the waste gate valve is requested to be increased above the above-described predetermined reference opening degree, the following control is performed when the inter-cylinder air-fuel ratio imbalance determination is carried out: the opening degree of the waste gate valve is controlled to be lower than the predetermined reference opening degree, and the throttle opening is controlled toward a decrease side so as to suppress an increase of the intake air amount above the intake air amount obtained when the waste gate valve is not controlled. The reference opening degree in this case is suitably set to the same value as the reference value for the closure determination in step S103 in the above-described first embodiment, that is, the reference opening degree is suitably set such that, when the opening degree of the WGV 27 is smaller than the reference opening degree, the mixture of exhaust gases with different phases is suppressed to within the allowable region, and a sufficient amount of exhaust gas having passed through the exhaust turbine 25*b* reaches the pre-catalyst sensor 17. The ECU 22 in the fourth embodiment is further equipped with the function of a cooperation control unit according to the present invention. The remaining part of the mechanical configuration of the fourth embodiment is similar to the corresponding part of the mechanical configuration of the above-described first embodiment and will thus not be described below in detail.

Figure 8:
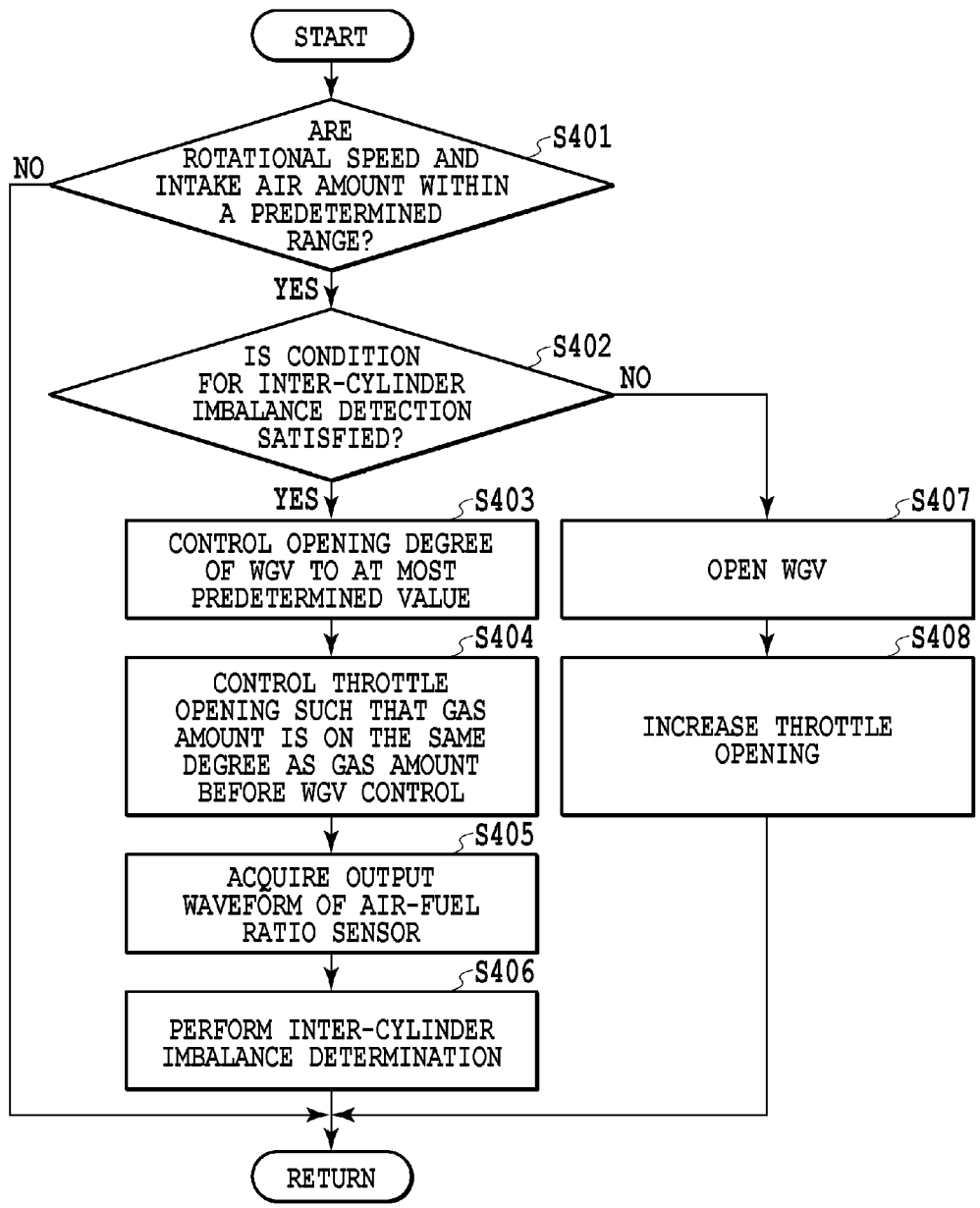
FIG. 8 is a flowchart depicting a routine for inter-cylinder air-fuel ratio imbalance detection according to a fourth embodiment.

Control according to the fourth embodiment will be described in accordance with FIG. 8. First, the ECU 22 determines whether the current engine rotational speed and the current intake air amount fall within a predetermined region based on outputs from the crank angle sensor 16 and the air flow meter 5 (S401). The predetermined region corresponds to the operating condition where the waste gate valve is open during the normal control. Specifically, the predetermined region is set, based on the map, to be the operating region in which the desired output can be achieved without supercharging, that is, the low-load region in which both the engine rotational speed and the intake air amount are relatively small. When the determination is negative, the processing is returned.

When the determination in step S401 is affirmative, the ECU 22 then determines whether or not the predetermined condition suitable for the abnormality detection has been satisfied (S402). The processing in step S402 is similar to the processing in step S101 in the above-described first embodiment (FIG. 5).

When the determination in step S402 is negative, the ECU 22 performs the above-described pumping loss reduction control by opening the WGV 27 (S407) and increasing the throttle opening above the throttle opening for the normal control (S408). As a result, the opening degree of the WGV 27 is set higher than the same value as the reference value for the closure determination in step S103 in the above-described first embodiment. This avoids utilizing the turbocharger 25 to allow the internal combustion engine 1 to be operated as a so-called a natural aspiration engine, reducing a pumping loss. The normal control in this case refers to a control state where such a change of the control (open control for the WGV 27) is not performed.

On the other hand, when the determination in step S402 is affirmative, the ECU 22 then controls the opening degree of the WGV 27 to at most the predetermined value (S403). This control of the WGV 27 may be performed by means of feedback control that utilizes an output from the WGV opening sensor 28, or open loop control that utilizes the count of the number of rotations of the motor driving the WGV 27 instead of the output from the WGV opening sensor 28. The predetermined value, that is, a target value for the opening degree of the WGV 27 is set to the same value as the reference value for the closure determination in step S102 in the above-described first embodiment, that is, the predetermined value is set to be able to achieve at least a predetermined supercharge pressure so that, when the opening degree of the WGV 27 is smaller than the predetermined value, the mixture of exhaust gases with different phases is suppressed to within the allowable region, and a sufficient amount of exhaust gas having passed through the exhaust turbine 25*b* reaches the pre-catalyst sensor 17. As a result, the opening degree of the WGV 27 is smaller than the opening degree for the normal control. The routine may be configured to involve a process of determining whether the opening degree of the WGV 27 is equal to or smaller than the predetermined value instead of the processing in step S403 so that the processing is returned when this determination is negative. In this case, when the result of the determination indicates that the opening degree of the WGV 27 is larger than the predetermined value, the imbalance determination is prohibited.

When the processing in step S403 ends, the ECU 22 then provides a control output to the throttle valve 10 to make the engine rotational speed and the torque of the internal combustion engine 1 equivalent to the rotational speed and the torque for the normal control, while controlling the throttle opening so as to make the intake air amount equivalent to the intake air amount obtained when the control of the WGV 27 in step S403 is not performed (S404). This allows the opening degree of the throttle valve 10 to be controlled toward a decrease side relative to the opening degree for the normal control. When the WGV 27 is controlled to be closed to at most a predetermined opening degree under an operating condition where, during the normal control, the WGV 27 is demanded to be opened (S403), the torque may increase to cause unintended degradation of drivability. In this regard, in this embodiment, the opening degree of the throttle valve 10 is reduced to suppress a possible increase in the torque resulting from an increased intake air amount. This allows to suppress unintended degradation of drivability. "Equivalent" as used herein means that the value falls within an error region including the identical value.

Then, with the opening degree of the WGV 27 controlled to at most the predetermined value, a fluctuation in air-fuel ratio is detected based on the output from the pre-catalyst sensor 17 (S405). Based on the detected fluctuation in air-fuel ratio, the imbalance determination is carried out (S406). The processing in steps S405 and S406 is similar to the processing in steps S104 and S105 in the above-described first embodiment (FIG. 5).

As a result of a series of such processes, in the present embodiment, even under the operating condition (401) where the WGV 27 is open during the normal control (that is, the pumping loss reduction control is performed), the following control is executed when the inter-cylinder air-fuel ratio imbalance determination is carried out (S402): the WGV 27 is controlled to be closed to at most the predetermined opening degree (S403), and the intake air amount is controlled based on the throttle opening (S404). This enables suppression of a possible decrease in accuracy resulting from the mixture of exhaust gas having passed through the exhaust turbine 25*b* and exhaust gas having passed through the bypass passage 26. Thus, possible misdetection can be suppressed to allow the imbalance detection to be accurately performed.

In the fourth embodiment, under such an operating condition as involves execution of the pumping loss reduction control (S401), cooperation control for the WGV 27 and the throttle valve 10 (S403 and S404) is performed. However, the cooperation control according to the present invention may be performed under such a predetermined operating condition as involves an increase in the opening degree of the WGV 27 above the opening degree for the normal control for any other purpose. Furthermore, in the fourth embodiment, the opening degree of the throttle valve 10 is controlled so as to make the exhaust gas amount supplied to the pre-catalyst sensor 17 equivalent to the gas amount supplied when the control of the WGV 27 is not performed. However, the opening degree of the throttle valve 10 may be controlled toward a decrease side so as to suppress an increase in the intake air amount above the intake air amount obtained when the closure control of the WGV 27 (S403) is not performed. This control need not achieve an equivalent intake air amount (that is, need not set the intake air amount to fall within a predetermined error region including the identical value).

The present invention is not limited to the above-described aspects but includes variations, applications, and equivalents embraced in the concepts of the present invention defined by the claims. Thus, the present invention should not be interpreted in a limited manner but is applicable to any other technique belonging to the scope of the concepts of the present invention.

For example, the imbalance detection in each embodiment uses the mean value $\Delta A/F_{AV}$ of the output difference $\Delta A/F_n$. However, any other value may be used provided that the value corresponds to a parameter correlated with the degree of fluctuation in output.

Furthermore, in each embodiment, rich-side deviation abnormality is detected by utilizing the output from the air-fuel ratio sensor obtained only during a decrease (during a change toward the rich side). However, an embodiment is also possible which utilizes the output from the air-fuel ratio sensor obtained only during an increase (during a change toward the lean side) or both during a decrease and during an increase. Additionally, not only the rich-side deviation abnormality but also lean-side deviation abnormality can be detected, or air-fuel ratio imbalance in general may be detected without distinction between rich-side deviation and lean-side deviation.

Furthermore, the various technical measures described herein may be combined together wherever possible. For example, it is preferable to combinatorially perform the cooperation control for the WGV 27 and the throttle valve 10 in the fourth embodiment (S403 and S404) and the selection of an operating region with "a lower rotational speed and a higher load" compared to the operating region for the normal control (S302). Such coupling may be implemented, for example, by inserting the processing in step S302 in the third embodiment between steps S402 and S403 in the fourth embodiment (FIG. 8). In this case, the ECU 22 is further equipped with the function of a low-rotation high-load control unit according to the present invention.

The invention claimed is:

1. An apparatus for detecting inter-cylinder air-fuel ratio imbalance in multi-cylinder internal combustion engine comprising:
   a turbocharger installed in association with a multi-cylinder internal combustion engine;
   a bypass passage configured to bypass a turbine of the turbocharger;

a waste gate valve configured to open and close the bypass passage;

an air-fuel ratio sensor installed in a portion of an exhaust passage of the multi-cylinder internal combustion engine which portion is located at an inlet of a catalyst and located on a downstream side of a junction between a downstream side of the turbine and a downstream side of the bypass passage; and a determination unit programmed to compare a value of a degree of fluctuation in an output from the air-fuel ratio sensor or a parameter correlated therewith with a predetermined threshold to perform inter-cylinder air-fuel ratio imbalance determination, wherein the determination unit is programmed not to perform the inter-cylinder air-fuel ratio imbalance determination when an opening degree of the waste gate valve is equal to or higher than a predetermined reference opening degree, when the inter-cylinder air-fuel ratio imbalance determination is performed under a predetermined operating condition where the opening degree of the waste gate valve is requested to be increased above the predetermined reference opening degree, the determination unit is further programmed for executable instructions of controlling the opening degree of the waste gate valve to be smaller than the predetermined reference opening degree, and reducing an opening degree of a throttle valve in the multi-cylinder internal combustion engine until a current air intake amount is equivalent to an air intake amount when the opening degree of the waste gate valve was requested to be increased above the predetermined reference opening degree and prior to the step of controlling the opening degree of the waste gate valve to be smaller than the predetermined reference opening degree so as to suppress an increase in torque resulting from an increase of the intake air amount.

2. An apparatus for detecting inter-cylinder air-fuel ratio imbalance in multi-cylinder internal combustion engine comprising:

a turbocharger installed in association with a multi-cylinder internal combustion engine;

a bypass passage configured to bypass a turbine of the turbocharger;

a waste gate valve configured to open and close the bypass passage;

an air-fuel ratio sensor installed in a portion of an exhaust passage of the multi-cylinder internal combustion engine which portion is located at an inlet of a catalyst and located on a downstream side of a junction between a downstream side of the turbine and a downstream side of the bypass passage; and a determination unit programmed to compare a value of a degree of fluctuation in an output from the air-fuel ratio sensor or a parameter correlated therewith with a predetermined threshold to perform inter-cylinder air-fuel ratio imbalance determination, wherein the determination unit is programmed not to perform the inter-cylinder air-fuel ratio imbalance determination when an opening degree of the waste gate valve is equal to or higher than a predetermined reference opening degree, when the inter-cylinder air-fuel ratio imbalance determination is performed, the determination unit is further programmed for executable instructions of controlling the multi-cylinder internal combustion engine and an automatic transmission connected to the multi-cylinder internal combustion engine to obtain an engine rotational speed being smaller and a load being higher than a rotational speed and an engine load immediately prior to the step of controlling the multi-cylinder internal combustion engine and the automatic transmission connected to the multi-cylinder internal combustion engine.

* * * * *